US010311385B2

(12) United States Patent
Looman et al.

(10) Patent No.: US 10,311,385 B2
(45) Date of Patent: Jun. 4, 2019

(54) VEHICLE FLEET ROUTING SYSTEM

(71) Applicant: Verizon Patent and Licensing Inc., Basking Ridge, NJ (US)

(72) Inventors: William George Looman, Christchurch (NZ); Jefferson Ray Tan Hidayat, Christchurch (NZ); Katherine Winnie Kok, Christchurch (NZ); Mark Robert Dunlop, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 300 days.

(21) Appl. No.: 15/233,838

(22) Filed: Aug. 10, 2016

(65) Prior Publication Data

US 2017/0061335 A1  Mar. 2, 2017

Related U.S. Application Data

(63) Continuation of application No. 13/903,904, filed on May 28, 2013, now abandoned.
(Continued)

(51) Int. Cl.
*G06Q 10/04* (2012.01)
*G06Q 10/06* (2012.01)
*G06Q 10/08* (2012.01)
*G08G 1/00* (2006.01)
*G01C 21/36* (2006.01)

(52) U.S. Cl.
CPC ....... *G06Q 10/047* (2013.01); *G01C 21/3632* (2013.01); *G01C 21/3667* (2013.01); *G06Q 10/0637* (2013.01); *G06Q 10/06315* (2013.01); *G06Q 10/0833* (2013.01); *G06Q 10/08355* (2013.01); *G08G 1/202* (2013.01)

(58) Field of Classification Search
CPC ......... G06Q 10/00; G06Q 40/06; G06F 17/60
USPC ....................................................... 705/7.25
See application file for complete search history.

(56) References Cited

U.S. PATENT DOCUMENTS 5,003,317 A  3/1991  Gray et al.
5,638,523 A  6/1997  Mullet et al.
(Continued)

OTHER PUBLICATIONS

The Stable Marriage Problem http://www.cs.vassar.edu/~cs241/teneyck/TheStableMarriageProblem.pdf, 2 pages. accessed on Apr. 29, 2013.
(Continued)

*Primary Examiner* — Romain Jeanty

(57) ABSTRACT

In one embodiment, a system includes a memory device and a hardware processor. The memory can store multiple locations positioned along a network of streets in a geographic region. The hardware processor can assign some of the multiple locations to multiple territories associated with multiple vehicles by iteratively: determining whether an allocation threshold is met for the multiple territories and, in response to determining that the allocation threshold is unmet for at least two of the multiple territories, assigning one of the multiple locations not yet assigned to the multiple territories to one of the at least two of the multiple territories. In addition, the hardware processor can generate multiple routes connecting the multiple locations for the multiple vehicles so that each of the multiple routes connects the locations of the multiple locations assigned to one of the multiple territories.

20 Claims, 12 Drawing Sheets

Related U.S. Application Data

(60) Provisional application No. 61/660,600, filed on Jun. 15, 2012, provisional application No. 61/666,555, filed on Jun. 29, 2012.

(56) References Cited

U.S. PATENT DOCUMENTS

| | | | |
|---|---|---|---|
| 5,659,476 A * | 8/1997 | LeFebvre | G01C 21/3415 701/417 |
| 5,724,243 A | 3/1998 | Westerlage et al. | |
| 5,808,907 A | 9/1998 | Shetty et al. | |
| 5,880,958 A | 3/1999 | Helms et al. | |
| 5,904,727 A | 5/1999 | Prabhakaran | |
| 6,025,843 A | 2/2000 | Sklar | |
| 6,075,530 A | 6/2000 | Lucas et al. | |
| 6,097,998 A | 8/2000 | Lancki | |
| 6,112,015 A | 8/2000 | Planas et al. | |
| 6,144,920 A | 11/2000 | Mikame | |
| 6,216,134 B1 | 4/2001 | Heckeman | |
| 6,252,605 B1 | 6/2001 | Beesley et al. | |
| 6,308,120 B1 | 10/2001 | Good | |
| 6,324,468 B1 * | 11/2001 | Meis | G01C 21/34 701/25 |
| 6,339,745 B1 | 1/2002 | Novik | |
| 6,477,452 B2 | 11/2002 | Good | |
| 6,611,755 B1 | 8/2003 | Coffee et al. | |
| 6,675,150 B1 | 1/2004 | Camer | |
| 6,879,910 B2 | 4/2005 | Shike et al. | |
| 6,970,825 B1 | 11/2005 | Altendahl et al. | |
| 7,143,100 B2 | 11/2006 | Carlson et al. | |
| 7,158,136 B2 | 1/2007 | Gannon | |
| 7,174,243 B1 | 2/2007 | Lightner et al. | |
| 7,194,347 B2 | 3/2007 | Harumoto et al. | |
| 7,323,982 B2 | 1/2008 | Staton et al. | |
| 7,395,140 B2 | 7/2008 | Christie et al. | |
| 7,499,925 B2 | 3/2009 | Moore | |
| 7,587,411 B2 | 9/2009 | De Vorchik | |
| 7,743,346 B2 | 6/2010 | Kyle | |
| 7,756,615 B2 | 7/2010 | Barfoot et al. | |
| 7,828,655 B2 | 11/2010 | Uhlir et al. | |
| 7,913,179 B2 | 3/2011 | Sheha et al. | |
| 7,913,188 B1 | 3/2011 | Krenz et al. | |
| 7,957,871 B1 | 6/2011 | Echeruo | |
| 7,974,774 B2 | 7/2011 | Kumar | |
| 8,103,532 B2 | 1/2012 | Kenefic | |
| 8,194,986 B2 | 6/2012 | Conwell | |
| 8,200,376 B2 | 6/2012 | Mattingly et al. | |
| 8,290,701 B2 | 10/2012 | Mason et al. | |
| 8,315,802 B2 | 11/2012 | Brown | |
| 8,452,529 B2 | 5/2013 | Alten | |
| 8,745,516 B2 | 6/2014 | Mason et al. | |
| 2002/0077750 A1 | 6/2002 | McDonald et al. | |
| 2002/0111715 A1 | 8/2002 | Richard | |
| 2003/0018428 A1 | 1/2003 | Knockeart et al. | |
| 2004/0039504 A1 | 2/2004 | Coffee et al. | |
| 2004/0077347 A1 | 4/2004 | Lauber et al. | |
| 2004/0088392 A1 | 5/2004 | Barrett et al. | |
| 2004/0090950 A1 | 5/2004 | Lauber et al. | |
| 2004/0254698 A1 | 12/2004 | Hubbard et al. | |
| 2005/0004757 A1 | 1/2005 | Neeman et al. | |
| 2005/0080520 A1 | 4/2005 | Kline et al. | |
| 2005/0090978 A1 | 4/2005 | Bathory et al. | |
| 2005/0143909 A1 | 6/2005 | Orwant | |
| 2005/0195096 A1 | 9/2005 | Ward et al. | |
| 2005/0216182 A1 | 9/2005 | Hussain et al. | |
| 2005/0222933 A1 | 10/2005 | Wesby | |
| 2006/0074553 A1 | 4/2006 | Foo | |
| 2006/0099959 A1 | 5/2006 | Stanton et al. | |
| 2006/0100777 A1 | 5/2006 | Station et al. | |
| 2006/0129691 A1 | 6/2006 | Coffee et al. | |
| 2006/0184403 A1 | 8/2006 | Scott et al. | |
| 2006/0184405 A1 | 8/2006 | Scott et al. | |
| 2006/0212327 A1 | 9/2006 | Norman | |
| 2006/0213817 A1 | 9/2006 | Scott et al. | |
| 2007/0173993 A1 | 7/2007 | Nielsen et al. | |
| 2007/0179709 A1 | 8/2007 | Doyle | |
| 2007/0233374 A1 | 10/2007 | Diekhans et al. | |
| 2007/0241882 A1 | 10/2007 | Panttaja et al. | |
| 2007/0288163 A1 | 12/2007 | Meyer et al. | |
| 2008/0014908 A1 | 1/2008 | Vasant | |
| 2008/0036778 A1 | 2/2008 | Sheha et al. | |
| 2008/0045234 A1 | 2/2008 | Reed | |
| 2008/0052142 A1 | 2/2008 | Bailey et al. | |
| 2008/0071428 A1 | 3/2008 | Kim | |
| 2008/0097731 A1 | 4/2008 | Lanes et al. | |
| 2008/0121690 A1 | 5/2008 | Carani | |
| 2008/0125964 A1 | 5/2008 | Carani | |
| 2008/0174485 A1 | 7/2008 | Carani | |
| 2008/0318597 A1 | 12/2008 | Berns | |
| 2009/0003657 A1 | 1/2009 | Deardorff | |
| 2009/0073034 A1 | 3/2009 | Lin | |
| 2009/0077221 A1 | 3/2009 | Eisenstadt | |
| 2009/0292464 A1 | 11/2009 | Fuchs | |
| 2009/0326991 A1 | 12/2009 | Wei et al. | |
| 2010/0076675 A1 | 3/2010 | Barth et al. | |
| 2010/0076968 A1 | 3/2010 | Boyns | |
| 2010/0115462 A1 | 5/2010 | Spencer | |
| 2010/0153005 A1 | 6/2010 | Cerecke et al. | |
| 2010/0168942 A1 | 7/2010 | Noffsinger et al. | |
| 2010/0205022 A1 | 8/2010 | Brown | |
| 2010/0211340 A1 | 8/2010 | Lowenthal et al. | |
| 2010/0274479 A1 | 10/2010 | Sheha et al. | |
| 2010/0281381 A1 | 11/2010 | Meaney et al. | |
| 2010/0287073 A1 | 11/2010 | Kocis et al. | |
| 2011/0016199 A1 | 1/2011 | De Carlo et al. | |
| 2011/0016514 A1 | 1/2011 | De Carlo et al. | |
| 2011/0040440 A1 | 2/2011 | de Oliveira et al. | |
| 2011/0093306 A1 | 4/2011 | Nielsen et al. | |
| 2011/0238457 A1 | 9/2011 | Mason et al. | |
| 2011/0288762 A1 | 11/2011 | Kuznetsov | |
| 2011/0289019 A1 | 11/2011 | Radloff et al. | |
| 2012/0029964 A1 | 2/2012 | Tengler et al. | |
| 2012/0072244 A1 | 3/2012 | Collins et al. | |
| 2012/0101855 A1 | 4/2012 | Collins et al. | |
| 2012/0179361 A1 | 7/2012 | Mineta et al. | |
| 2012/0310691 A1 * | 12/2012 | Carlsson | G06Q 10/047 705/7.13 |
| 2013/0069803 A1 | 3/2013 | McCormick et al. | |
| 2013/0079964 A1 | 3/2013 | Sukkarie et al. | |
| 2013/0096815 A1 | 4/2013 | Mason et al. | |
| 2013/0339098 A1 | 12/2013 | Looman et al. | |
| 2013/0339266 A1 | 12/2013 | Looman et al. | |

OTHER PUBLICATIONS

International Search Report and Written Opinion issued in application No. PCT/US12/56423 dated Apr. 4, 2013.
Raidl et al., "Greedy Heuristics and an Evolutionary Algorithm for the Bounded-Diameter Minimum Spanning Tree Problem.", SAC, Melbourne, FL, pp. 747-752, 2003.
Malik et al., "Combinational Motion Planning of Multiple Vehicle Systems", Proceedings of the 45th IEEE Conference on Decision and Control, Manchester Grand Hyatt Hotel, San Diego, CA Dec. 13-15, 2006, pp. 5299-5304.
International Search Report and Written Opinion issued in application No. PCT/US2012/059404 dated Jan. 17, 2013.
A Tutorial on Clustering Algorithms, Fuzzy C-Means Clustering http://home.dei.polimi.it/matteucc/Clustering/tutorial_html/cmeans.html, 5 pages, accessed on May 8, 2012.
Ant Colony Optimization Algorithms, From Wikipedia, http://en.wikipedia.org/wiki/Ant_colony_optimization_algorithms, 13 pages, accessed on May 8, 2012.
International Search Report and Written Opinion issued in application No. PCT/US2013/042924 dated Dec. 20, 2013, in 10 pages.
International Search Report and Written Opinion issued in application No. PCT/US13/46016 dated Dec. 30, 2013, in 14 pages.
Kim, Byung-In, Seongbae Kim, and Surya Sahoo. "Waste collection vehicle routing problem with time windows." Computers & Operations Research 33.23 (2006):3624-3642.
U.S. Appl. No. 14/987,097, Vehicle Fleet Work Order Management System, filed Jan. 4, 2016.

(56) References Cited

OTHER PUBLICATIONS

U.S. Appl. No. 13/918,821, Vehicle Fleet Routing System, filed Jan. 14, 2013.

* cited by examiner

VEHICLE FLEET ROUTING SYSTEM

RELATED APPLICATIONS

This application is a continuation of U.S. patent application Ser. No. 13/903,904, filed May 28, 2013, entitled "VEHICLE FLEET ROUTING SYSTEM," which claims the benefit of priority under 35 U.S.C. § 119(e) to U.S. Provisional Patent Application No. 61/660,600, filed on Jun. 15, 2012, entitled "VEHICLE FLEET ROUTING SYSTEM," and U.S. Provisional Patent Application No. 61/666,555, filed on Jun. 29, 2012, entitled "VEHICLE FLEET ROUTING SYSTEM," the disclosures of both of which are hereby incorporated by reference in their entirety.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

For purposes of summarizing the disclosure, certain aspects, advantages and novel features have been described herein. It is to be understood that not necessarily all such advantages can be achieved in accordance with any particular embodiment disclosed herein. Thus, the features disclosed herein can be embodied or carried out in a manner that achieves or optimizes one advantage or group of advantages as taught herein without necessarily achieving other advantages as can be taught or suggested herein.

Routing systems for developing complete routes for a plurality of vehicles, wherein the vehicles are pre-associated with defined territories with fixed boundaries, can be further improved by configuring a routing system to consider routes without fixed boundaries and with an alternative association between the vehicle and territory. For example, some known routing systems allow user to define a territory for each driver-oriented vehicle by manually drawing fixed boundaries around a geographical location. The user can usually make these territories in any desired shape. Thus, the territories are often shaped depending upon a user's client base and/or geographical features of the land on which those clients reside. In some cases, the user can define fixed boundaries to define the territory centered at a driver's home. This might result in a grid-like arrangement of predefined territories. In other environments, a user might define territories in a pie shaped or centered around a distribution center, for example.

Other techniques can be used to define boundaries of a territory without using fixed boundaries, such as a street, a road, a geographical feature, a town, city, or county line, and the like. In some embodiments, a territory could be defined by a radius around a predefined point. Additionally, territories can be overlapped such that the radius of two adjacent territories overlaps geographically such that two vehicles could be routed to the same place.

A territory can additionally or alternatively be defined by a weighted characteristic, such as a distance from a gravity or reference point. For example, one territory might be defined as including any stop from a predetermined reference point. The farther away that a stop is from the predetermined point, the more costly the stop can be weighted when determining routes for a plurality of vehicles in a plurality of corresponding territories. In this environment of use, territories may be considered as being infinitely large. However, a routing algorithm can calculate the cost of a stop that is far away from the associated reference point of a territory as being too costly to include in a calculated route. That faraway stop can instead be included in a route for a vehicle that has its reference point closer to the faraway stop. The weighted characteristic may follow a non-linear relationship, such as a squared or cubed relationship. Other non-linear relationships can be used, for example, but without limitation, log, and the like.

In some embodiments of the present disclosure, an iterative process can be used to assign stops to a territory based on a reference point associated with the territory. The stops can be assigned to a territory until a quota related to the stops of the territory is met, such as until the total revenue or total time-on-site for the stops meets or exceeds a threshold. This iterative process can be repeated for multiple territories so that the allocation of revenue, time-on-site, or other criteria for a fleet of vehicles can be balanced or controlled across the multiple territories. Once the stops have been assigned to territories, routes connecting the stops of each territory can be determined by finding an operable route for a vehicle of the fleet of vehicles in order to service the stops of each territory.

In some embodiments of the present disclosure, a minimum number of vehicles or drivers that can be used to service a set of stops can be determined. The number of vehicles or drivers can then be provided as an input to a stop assignment process to determine territories and assigned stops for the vehicles or drivers.

In accordance with some embodiments, a system for routing vehicles in a vehicle fleet includes a location assignment module comprising computer hardware and a routing module. The location assignment module can be configured to iteratively: determine whether quotas are met for a plurality of territories based at least on locations assigned to individual territories of the plurality of territories, and in response to determining that the quota is unmet for one or more individual territories, assign one or more additional locations to the one or more individual territories having unmet quotas based at least on a proximity of the one or more additional locations to a different reference location associated with each of the one or more individual territories having unmet quotas. The routing module can be configured to generate routes including the locations assigned to the individual territories for vehicles in a vehicle fleet.

The system of the preceding paragraph can include a combination of one or more of the following features: The quota can be met for a first territory of the plurality of territories in response to a total revenue for the locations assigned to the first territory meeting or exceeding the quota. The quota for the first territory can be the same as the quota for a second territory of the plurality of territories. The routing module can be configured to generate a first route including the locations assigned to the first territory and a second route including the locations assigned to the second territory. The quota can be met for a first territory of the plurality of territories in response to a total time-on-site for the locations assigned to the first territory meeting or exceeding the quota. The quota for the first territory is different from the quota for the second territory of the plurality of territories. The quota can be met for a first territory of the plurality of territories in response to a total estimated driving time for a first route including the locations assigned to the first territory meeting or exceeding the quota. The location assignment module can be further configured revise the position of the reference locations associated with the one or more individual territories having unmet quotas before assigning one or more additional locations to the one or more individual territories having unmet quotas. The location assignment module can be further configured to revise the position of the reference locations associated with the one or more individual territories having unmet quotas based at least on the locations assigned to the one or more individual territories having unmet quotas. The location assignment module can be further configured to assign one or more additional locations to the individual territories based at least on outlier detection and reassign one or more of the locations assigned to a first territory of the plurality of territories to a second territory of the plurality of territories to even out one or more criteria for the first territory and the second territory. The location assignment module is further configured to revise the position of the reference locations associated with the one or more individual territories having unmet quotas based at least on the locations assigned to the one or more individual territories having unmet quotas. The one or more criteria can include a total amount of revenue for each of the first territory and the second territory. The one or more criteria can include a total time-on-site for each of the first territory and the second territory. The system can further include a territory count module configured to determine a number of territories to include in the plurality of territories, the number of territories being a minimum number of territories to use to service a set of stops where each of the individual territories is associated with a different vehicle in the vehicle fleet. At least some of the plurality of territories can overlap one another.

In accordance with some embodiments, a method for routing vehicles in a vehicle fleet includes: assigning one or more unassigned locations of a plurality of locations to one of a first territory and a second territory based at least on the proximity of the one or more unassigned locations to a first reference location associated with the first territory and a second reference location associated with a second territory; in response to assigning the one or more unassigned locations to the first territory, determining with one or more processors whether a first quota for the first territory is met based at least on the one or more locations assigned to the first territory; in response to determining the first quota is unmet, assign one or more unassigned locations to the first territory based at least on the proximity of the one or more unassigned locations to the first reference location; in response to assigning the one or more unassigned locations to the second territory, determining with the one or more processors whether a second quota for the second territory is met based at least on the one or more locations assigned to the second territory; in response to determining the second quota is unmet, assigning one or more unassigned locations to the second territory based at least on the proximity of the one or more unassigned locations to the second reference location; and generating routes including the locations assigned to the first territory and the second territory for vehicles in a vehicle fleet.

The method of the preceding paragraph can include a combination of one or more of the following features: The first quota can be met in response to a total revenue for the locations assigned to the first territory meeting or exceeding the first quota. The first quota can be met in response to a total revenue for the locations assigned to the first territory meeting or exceeding the first quota. The first quota can be the same as the second quota. The method can further include revising the position of the first reference location and second reference location based at least on the one or more locations assigned to the first territory and the second territory before assigning one or more unassigned locations to the first territory or the second territory. The method can further include assigning one or more unassigned locations to the first territory or the second territory based at least on outlier detection. The method can further include reassigning one or more of the locations assigned to the first territory to the second territory to even out one or more criteria for the first territory and the second territory.

BRIEF DESCRIPTION OF THE DRAWINGS

The features of various embodiments disclosed herein are described below with reference to the drawings. Throughout the drawings, reference numbers are re-used to indicate correspondence between referenced elements. The drawings are provided to illustrate embodiments described herein and not to limit the scope thereof.

DETAILED DESCRIPTION

I. Introduction

The embodiments disclosed herein are described in the context of a routing system that can include various features. For example, the routing system can include features associated with creating routes for vehicle fleets where territories of the vehicle fleet may be adjacent to one another. A weighted system can be used to replace or supplement territories defined by fixed non-overlapping territorial boundaries. Advantageously, in certain embodiments, stops can be assigned to territories in a way that manages the distribution of one or more criteria across multiple territories of the vehicle fleet. For instance, revenue may not be spread evenly across a geographic region; however, territories for the geographic region can be determined such that revenue is allocated across the territories evenly or according to some apportionment scheme. Further, the routing system can include features for determining the number of vehicles or drivers that may be used to service a set of stops.

The features described herein may also be implemented for non-fleet vehicles, such as in personal vehicle navigation systems. However, for ease of illustration, the remainder of this disclosure will describe routing systems in the context of vehicle fleets, such as fleets of service vehicles, trucks, taxis, other transportation vehicles, emergency vehicles, and the like.

As used herein, the terms "optimal," "optimized," and the like, in addition to having their ordinary meaning, when applied to a route can sometimes refer to a route that has a lower cost than other routes as determined by a routing algorithm. An optimal route may be the best route available (e.g., least cost), or an optimal route may simply be a route that satisfies certain routing algorithm constraints with lower cost than other available routes without necessarily being the absolute least-cost route. In addition, as used herein, the term "real time" and the like, in addition to having its ordinary meaning, can mean rapidly or within a certain expected or predefined time interval, and not necessarily immediately. For instance, real-time routing updates may be provided within a few minutes, or 5 minutes, or 10 minutes, or some other short period of time after receiving information that triggers re-calculation of a route.

II. Vehicle Management System Overview

Figure 1:
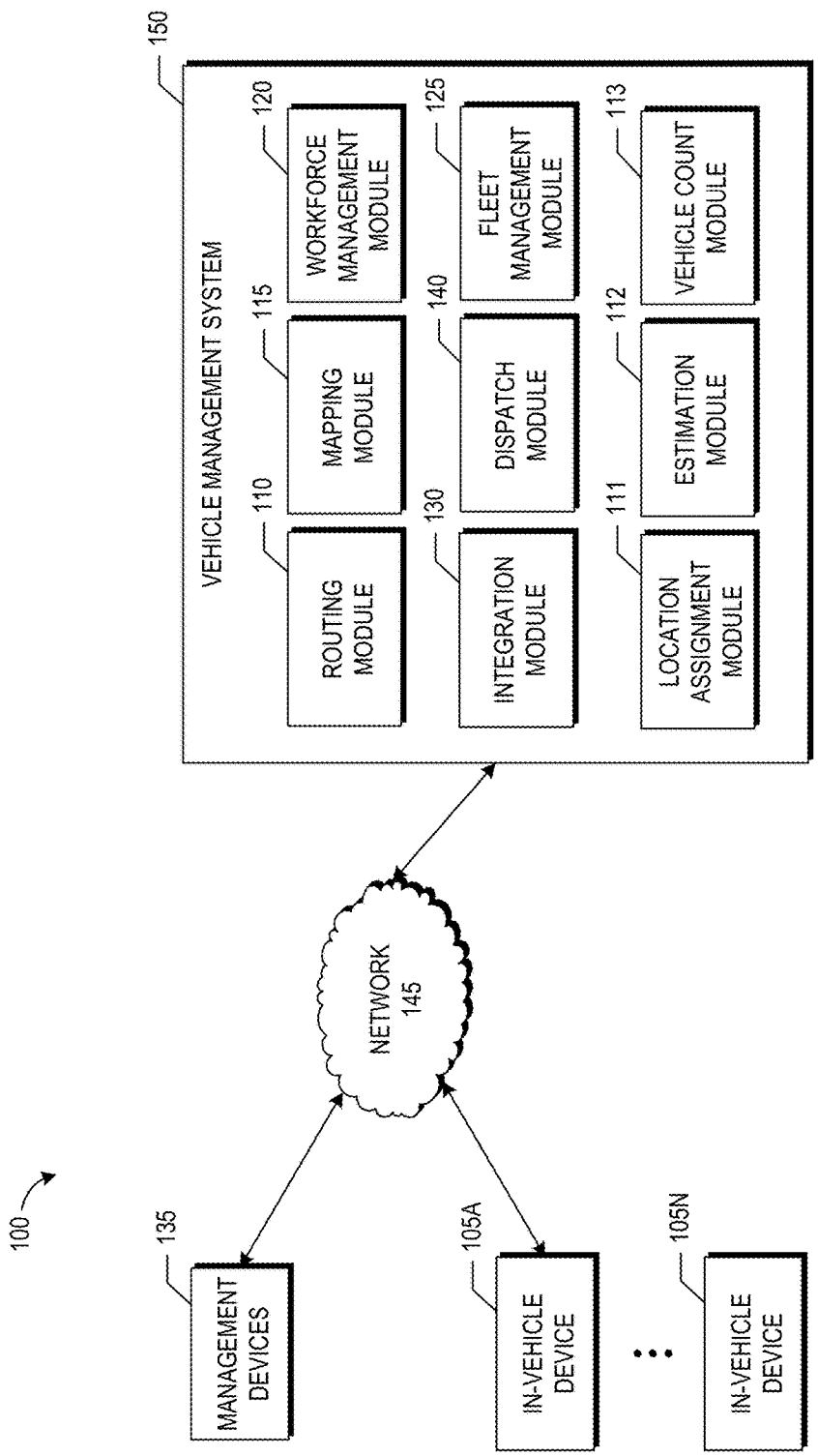
FIG. 1 illustrates an embodiment of a vehicle management system.

FIG. 1 illustrates an embodiment of a computing environment 100 for implementing an example vehicle management system 150. Among other features, the routing module 110 can include a location assignment module 111, an estimation module 112, and a vehicle count module 113.

The location assignment module 111 can be used to supplement or in substitution of fixed boundaries of a territory when processing a routing algorithm. For example, the location assignment module 111 can determine a gravity or reference point associated with a territory or multiple territories and assign one or more of a set of stops to the reference point. The stops can be assigned to the reference point based on a distance from the individual stops to the reference points and/or one or more other constraints, such as an amount of revenue generated by the individual stops or an amount of time-on-site for the individual stops. This assignment of stops can be used to generate routes which are more optimal, but might otherwise cause vehicles to cross territories that may have been defined by fixed boundaries. Although the term "location" may be used in some cases in this disclosure, the term "stop" may be used interchangeably with the term "location."

The estimation module 112 can be configured to calculate an estimated characteristic of an optimized route that might be generated for making a set of stops. This estimation can be useful for helping to compare the cost of servicing a set of stops with one vehicle with other routes based on a revision to the set of stops. Further, this estimation can be generated using a less computationally demanding algorithm than those used for creating usable routes that can be executed by vehicle and are optimized, for example, for cost. In some implementations, a heuristic can be used to estimate the cost of a route rather than solving the Traveling Salesman problem to calculate the route, for instance. Performing such distance estimations can enable the vehicle management system 150 to create an estimate of one or more routes prior to performing the actual route calculation. Providing this estimate or estimates in advance can help make informed decisions on how to allocate fleet resources, including drivers, vehicles, and/or other equipment. Such estimation algorithms are described in more detail in U.S. Patent Application Publication No. 2013/0096815, filed on Oct. 9, 2012, the disclosure of which is hereby incorporated by reference in its entirety.

The vehicle count module 113 can be configured to determine a minimum number of vehicles or drivers can be used to service a set of stops when territories are constructed using a gravity points approach.

In the computing environment 100, one or more in-vehicle devices 105A . . . 105N and management devices 135 communicate with the vehicle management system 150 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 150. In addition, the in-vehicle devices 105 can report information to the vehicle management system 150, such as driver location, vehicle sensor data, vehicle status (e.g., maintenance, tire pressure, or the like), and so forth. An example user interfaces for in-vehicle devices 105 is described further with respect to FIG. 3.

The management devices 135 can be computing devices used by dispatchers, fleet managers, administrators, or other users to manage different aspects of the vehicle management system 150. For example, a user of a management device 135 can access the vehicle management system 150 to generate routes, dispatch vehicles and drivers, and perform other individual vehicle or fleet management functions. With the management devices 135, users can access and monitor vehicle information obtained from one or more of the in-vehicle devices 105 by the vehicle management system 150. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices 135 are in fixed locations, such as at a dispatch center. The management devices 135 can also be used by administrators in the field, and may include mobile devices, laptops, tablets, smartphones, personal digital assistants (PDAs), desktops, or the like. Example user interfaces for management devices 135 are described in greater detail with respect to FIG. 3.

The vehicle management system 150 can be implemented by one or more physical computing devices, such as servers. These servers can be physically co-located or can be geographically separate, for example, in different data centers. In one embodiment, the vehicle management system 150 is implemented as a cloud computing application. For instance, the vehicle management system 150 can be a cloud-implemented platform hosted in one or more virtual servers and/or physical servers accessible to users over the Internet or other network 145. In the depicted embodiment, the vehicle management system 150 includes a routing module 110, a mapping module 115, a workforce management module 120, an integration module 130, a dispatch module 140, and a fleet management module 125. These components can, but need not, be integrated together on a common software or hardware platform.

The fleet management module 125 can include functionality for generating, rendering, or otherwise displaying a vehicle management user interface. The vehicle management user interface can include a map or list of vehicles that depicts symbols or other data representative of vehicles.

As used herein, the terms "output a user interface for presentation to a user," "presenting a user interface to a user," and the like, in addition to having their ordinary meaning, can also mean (among other things) transmitting user interface information over a network, such that a user device can actually display the user interface.

The fleet management module 125 can communicate with the mapping module 115 to obtain mapping data, which the fleet management module 125 can include in the vehicle management user interface. The mapping data can be compressed, transmitted, re-rendered, and displayed on the management user interface. Other data can also be overlaid to enhance the map and management layout. The mapping module 115 can be a geographic information system (GIS) in one embodiment. The fleet management module 125 can also access vehicle status data based on telematics data obtained from the in-vehicle devices 105N. The telematics data can include such data as location or speed information obtained using GPS or cellular tower triangulation (or other methods), vehicle sensor data, solid state inertial information, or any other data that can be obtained from a vehicle, its engine, or the like (including other sensors such as passenger seat sensors to detect the presence of passengers and so forth).

The routing module 110 can implement any of the routing features described above. In addition, the routing module 110 can construct pre-dispatch or post-dispatch routes for vehicles based on any of a variety of routing algorithms, such as those disclosed in U.S. Publication No. 2010/0153005, filed Dec. 8, 2009, and entitled "System and Method for Efficient Routing on a Network in the Presence of Multiple-Edge Restrictions and Other Constraints," the disclosure of which is hereby incorporated by reference in its entirety. The routing module 110 can automatically select routes that take into account factors that affect energy usage using the techniques described in U.S. Publication No. 2011/0238457, filed Nov. 24, 2010, and entitled "Vehicle Route Selection Based on Energy Usage," the disclosure of which is hereby incorporated by reference in its entirety.

The integration module 130 can facilitate integration of the vehicle management system 150 with other systems, such as fuel card systems, payroll systems, supply chain system, insurance systems, and the like. The dispatch module 140 can provide functionality for users of the management devices 135 to assign drivers and vehicles to routes selected by the routing module 110.

The illustrated network 145 may be a LAN, a WAN, the Internet, combinations of the same, or the like. For ease of illustration, the vehicle management system 150 has been depicted as a centralized system. However, in other implementations, at least some of the functionality of the vehicle management system 150 is implemented in other devices. Other possible implementations of the vehicle management system 150 can include many more or fewer components than those shown in FIG. 1.

Figure 2:
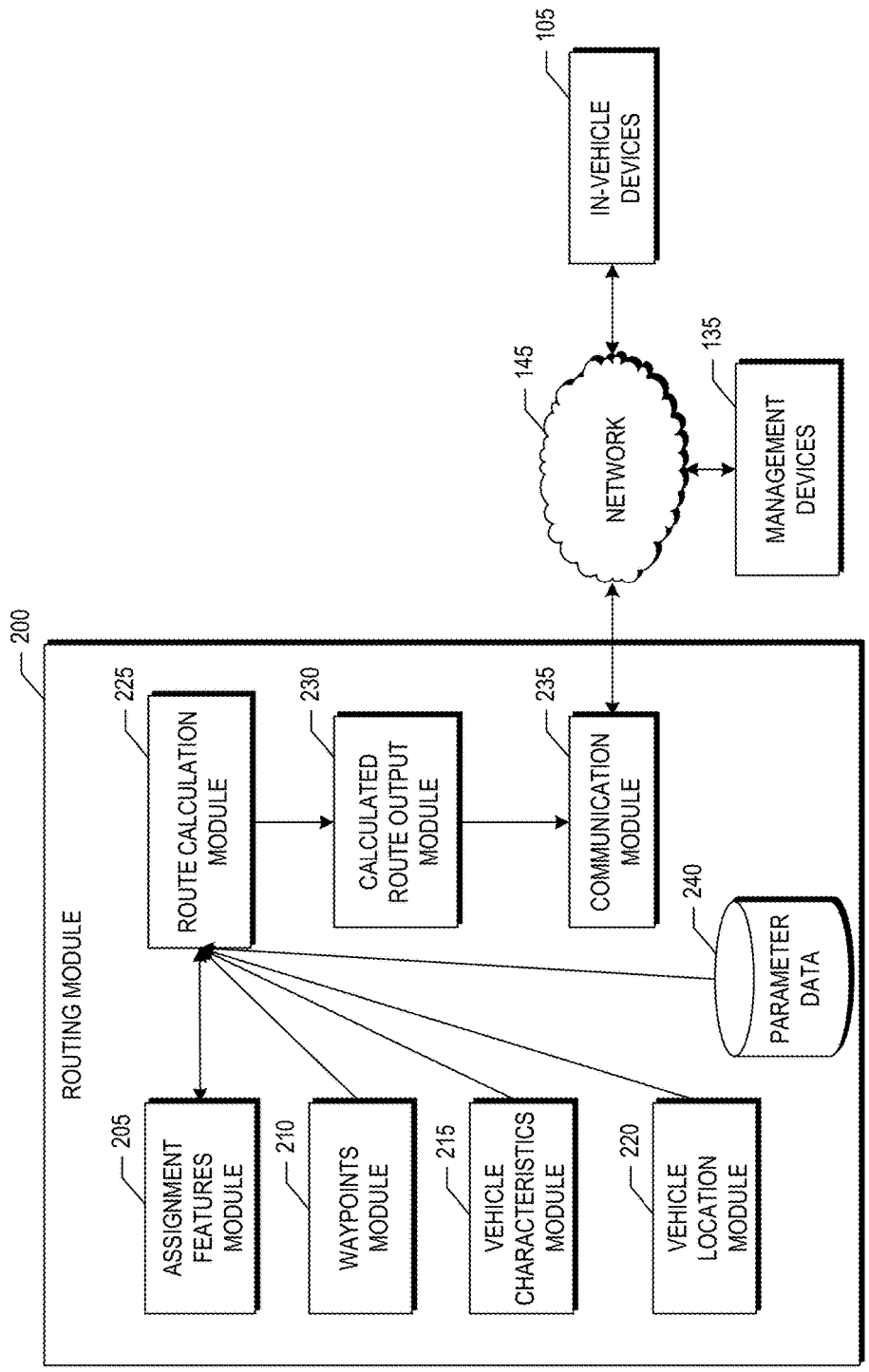
FIG. 2 illustrates an embodiment of a routing module.

Turning to FIG. 2, an embodiment of a routing module 200 is shown. The routing module 200 is a more detailed embodiment of the routing module 110 described above and includes all the features thereof. The management devices 135 and in-vehicle devices 105 of FIG. 1 are also shown communicating with the routing module 200 over the network 145.

In the depicted embodiment, the routing module 200 includes an assignment features module 205, waypoints module 210, a vehicle characteristics module 215, a vehicle location module 220, a route calculation module 225, a calculated route output module 230, and a communication module 235. The routing module 200 can also include one or more parameter databases or data repositories 240 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), and the like. The assignment features module 205 can be configured to perform the functions discussed with respect to the location assignment module 111, the estimation module 112, and the vehicle count module 113.

The waypoints module 210 can access waypoint data useful for constructing a route. The waypoint data can include a starting location, a target or destination location, intermediate waypoint locations, landmarks, and the like. The starting and ending location as well as possibly other waypoints can be input by a user of a management device 135. At least some of the waypoints data can also be provided to the waypoints module 210 from the mapping module 115 described above. Additionally, the waypoints module 210 can include boundaries for territories. For example, the waypoints module 210 can provide for a user interface in the management device 135 that allows the user to input predetermined, fixed boundaries to territories for respective vehicles in a vehicle fleet. Additionally, the waypoints module 210 can allow user to change the fixed boundaries of territories. In some embodiments, a user might choose to create fixed territory boundaries that do not overlap. However, the waypoints module 210 can also be configured to allow user to define territories so as to overlap.

The vehicle characteristics module 215 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, and the like.

The vehicle location module 220 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 105 or within a mobile device (e.g., a phone) carried by an operator of the vehicle.

The route calculation module 225 can determine one or more alternative feasible, or candidate, routes from a starting location to a destination location. The feasible routes can be determined using one or more initial searching algorithms based on one or more initial criteria, factors or variables (e.g., distance and/or estimated transit time) to trim down the search space to exclude unreasonable routes. The feasible routes can be determined based on input received from the waypoints module 210, the vehicle characteristics module 215, the vehicle location module 220, and/or the parameter database 240. In some embodiments, the route calculation module 225 determines custom routes between waypoint locations based on custom data.

The route selection determination methods are described in more detail in this disclosure; however, any number of search algorithms or methods can be used without departing from the spirit and/or scope of the disclosure, including but not limited to, breadth-first algorithms, depth-first algorithms, best-first algorithms, Djikstra's algorithm, the Hungarian (Munkres) algorithm, the A* algorithm, Traveling Salesman-related algorithms, linear programming algorithms, and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function is described in U.S. Patent Application Publication No. 2010/0153005, filed on Dec. 8, 2009, the disclosure of which is hereby incorporated by reference in its entirety.

The calculated route output module 230 can output the one or more routes identified by the route calculation module 225. The routes can be output to a vehicle-based display unit, a handheld mobile device, and/or to a remote location over the network 145 (e.g., the client computing device 135, the dispatch center 140). In some embodiments, the calculated route output module 230 can output feedback to a driver (e.g., directions, instructions, warnings, alerts, alarms). For example, the calculated route output module 230 can output a real-time suggested driving route modification based on traffic or weather conditions. The output feedback can include voice commands, audible alerts, and/or on-screen text or graphics. The feedback can advantageously change driver behavior to improve energy efficiency and reduce energy use. In some embodiments, the calculated route output module 230 is in communication with, and controls operation of, a display device and/or one or more audio devices.

In some embodiments, the calculated route output module 230 generates audible instructions or signals, thereby permitting a user of an in-vehicle device 105 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences. Further, in certain embodiments, the voice used to express the verbal directions can be changed without changing the language of the verbal directions.

The communication module 235 can facilitate communication by and with the routing module 200 over the network 145. In some embodiments, the communication module 235 receives data from the network 145 and transmits data to the management device 135 and to the in-vehicle devices 105. The communication module 235 can provide the route calculation module 225 with access to network resources or information databases, such as traffic and weather web sites, over the network 145.

The parameter database 240 can include one or more storage databases or other data repositories. In addition to storing the various road parameters described above, the parameter database can store any data that may be used to determine the costs of routes or portions of routes (e.g., legs). The parameter database 240 can be in communication with the route calculation module 225 and any of the other sub-modules of the routing module 200. In some embodiments, the parameter database 240 can be communicatively coupled to the network 145. As one example, the parameter database 240 can include look-up tables of information related to street classification data sets comprising street classifications. The look-up information can take characteristics of routing requests as inputs and enable look-ups of corresponding street classification data for use in routing calculations, for example. As another example, the parameter database 240 can store custom data as discussed in this disclosure for use in classifying streets.

In other embodiments, the parameter database 240 or other data repositories can reside on the client computing device 135, at the dispatch center 140, within a vehicle 105, or at other remote locations communicatively coupled to the network 145.

Figure 3:
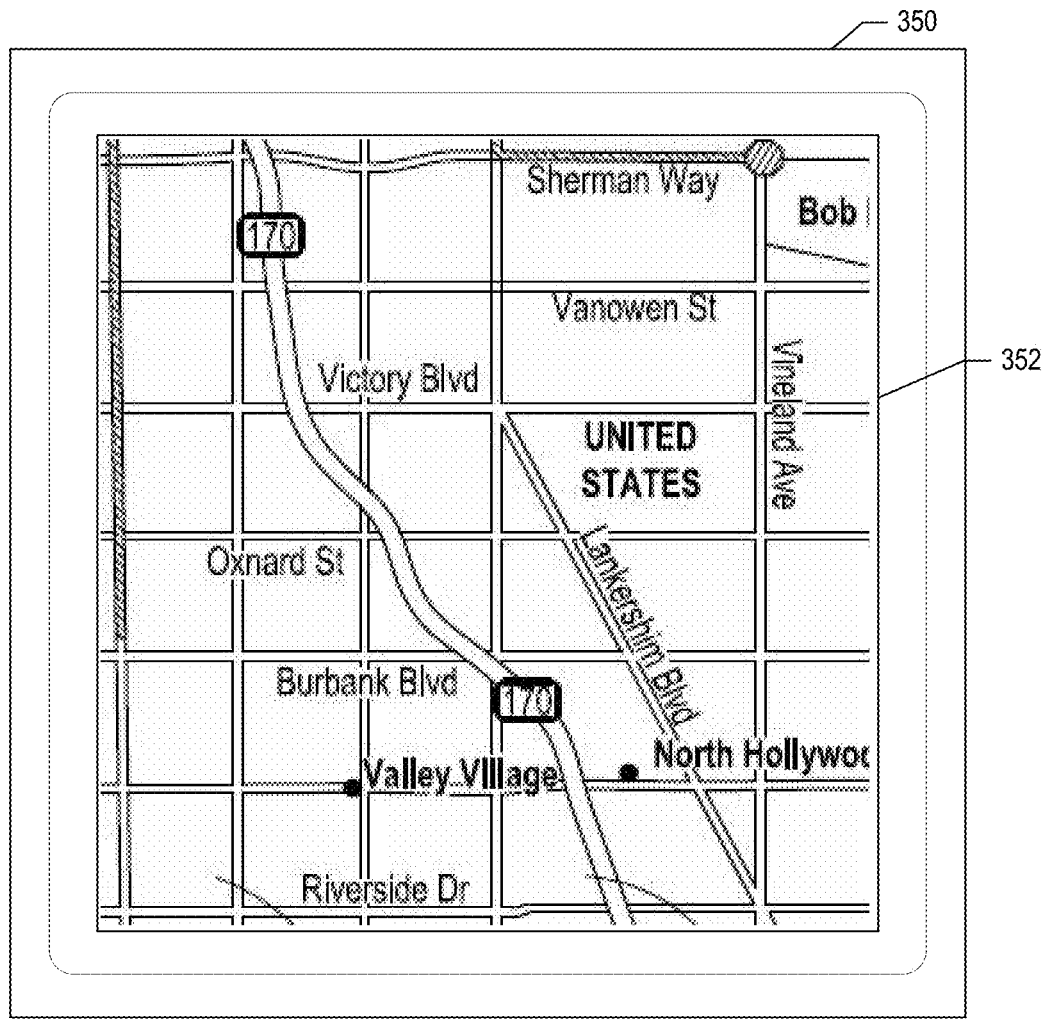
FIG. 3 illustrates an embodiment of a user interface display for outputting calculated routes.

Turning to FIG. 3, an embodiment of a user interface 350 for outputting calculated routes is illustrated. The user interface 350 can be part of one or more navigation devices associated with the plurality of vehicles, such as management devices 135 or in-vehicle devices 105. The map display 352 of the user interface 350 can present a street map with visual aids or directions that update in real time as the driver travels, thereby showing the driver's progress. The map display 352 can display one or more routes, which may include one or more intermediate stops. The visual aids can include arrows or similar colored lines overlaid over a street map.

The user interface 350 can include, but is not limited to, an LCD display, a heads-up display, an LED display, a 2D display, and/or a 3D display to instruct a user of the system which way to travel. In some embodiments, images displayed on the map display 352 simulate motion, such as a vehicle traveling down a city street. In some embodiments, the screen is interactive. For example, in some embodiments the user can input his current and destination locations, can update costs for given streets or routes, or can change his destination en route.

In some embodiments, the routing module 200 and the user interface 350 are integrated into a vehicle navigation or similar system. For example, in some embodiments, the visual outputs of the calculated route output module 230 are output via the vehicle's in-dash video display, and/or the audio outputs of the calculated route output module 230 are output via the car's audio speakers. In other embodiments, the user interface 350 is integrated in a mobile handheld device in communication with the network 145. In some embodiments, a vehicle or similar device is controlled directly by the routing module 200.

III. Gravity Points

The vehicle management system 150 can include a location assignment module 126, included in the routing module 110, or another one of the modules illustrated in FIG. 1. Other configurations can also be used. Some of the potential benefits of using the location assignment module 111 can be illustrated in light of the understanding that in some traditional routing systems, users are constrained by the routing software to assign drivers fixed borders, within which the routing program will generate routes for those drivers. The process of assigning or changing the fixed borders can be tedious and time-intensive. In addition, such borders can exclude many viable solutions from a routing optimization problem.

The vehicle management system 150 can additionally or alternatively provide functionality to define a point within a driver's territory, which can be considered a gravity point or reference point for a driver. In some embodiments, each driver can be assigned a reference point. The reference point can represent a point of maximum gravity, and the driver's territory can extend around the reference point. In such embodiments, the territories of multiple drivers can overlap thereby allowing the vehicle management system 150 to consider routes for one driver that might extend into an area that is also within the territory of another driver.

In some embodiments, the calculations associated with such a territory function such that as the straight line distance from the reference point to a second point increases, the gravity at the second point can decrease. For example, the gravity can decrease exponentially or linearly, or based on some other relationship, according to the distance from the reference point. The reference point thus can define a center of a cost field akin to a gravitational field surrounding a mass of matter. The routing algorithm used by the routing module 200 can take this gravity field into account as part of an optimization problem to determine whether to assign a driver to a stop, or vice versa.

Thus, for example, if a stop is between the reference points for two drivers, in one embodiment the routing algorithm picks the closest driver's reference point and assigns the stop to that reference point and driver. In another embodiment, the closeness of a stop to a reference point is merely one constraint of a plurality of constraints evaluated by an optimization problem of the routing module.

Advantageously, in certain embodiments, the gravity points approach to defining driver territories can take much less time for users to set up than the fixed borders approach. However, the gravity points approach can also take additional processing time for the optimization algorithm to process when assigning routes in certain cases. Given this reduced computing efficiency in certain cases, using reference points can be a counterintuitive approach to improving an optimization algorithm. In some embodiments, the vehicle management system 150 can be configured to allow a user to also input a maximum outer boundary of a territory for each vehicle. The general gravity points approach is discussed in greater detail in U.S. Patent Application Publication No. 2013/0096815, filed on Oct. 9, 2012, the disclosure of which is hereby incorporated by reference in its entirety.

Figure 4:
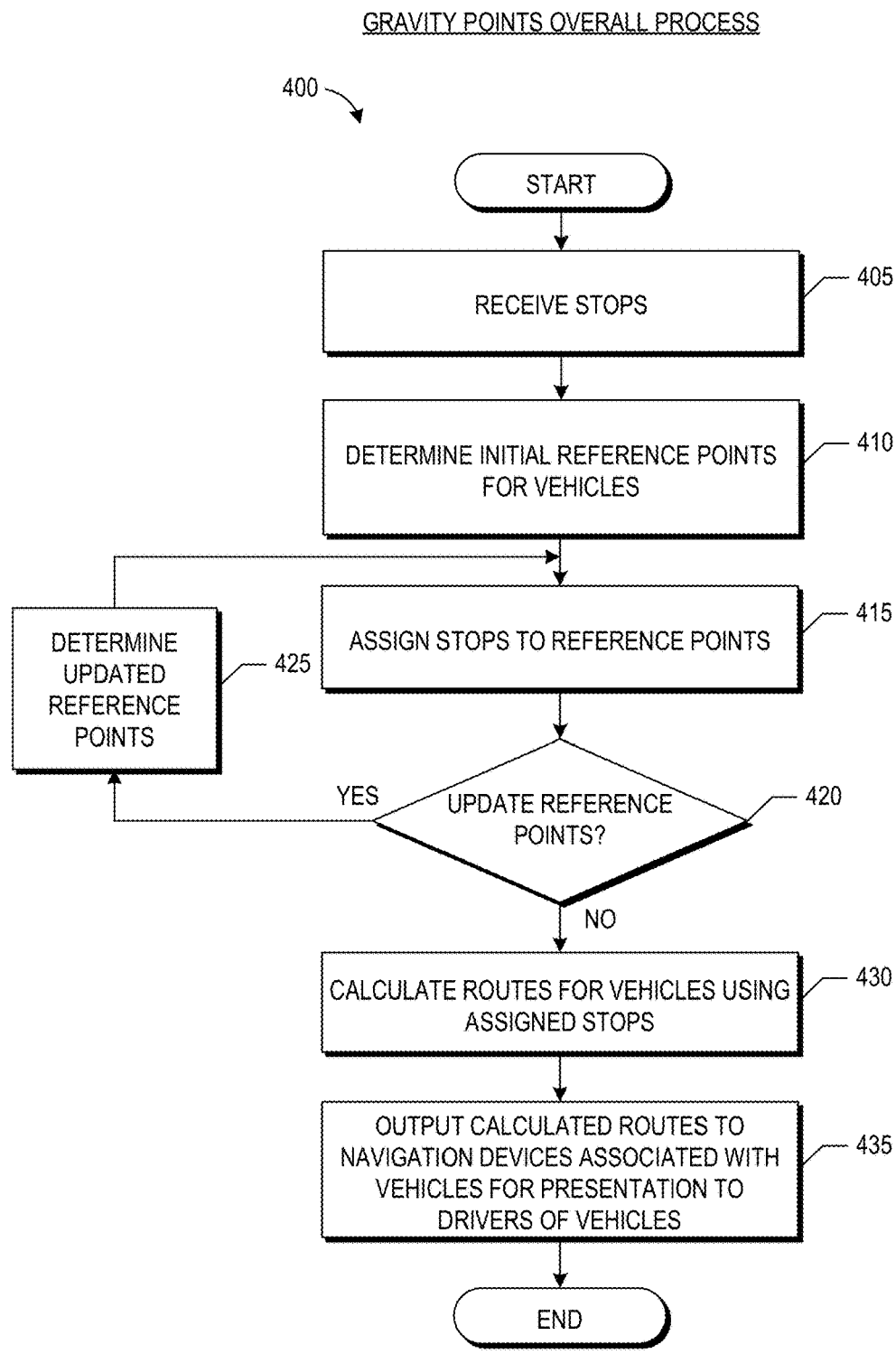
FIG. 4 illustrates an embodiment of a gravity points overall process.

With reference to FIG. 4, a process 400 for determining and utilizing reference points is illustrated. The process 400 can be performed, for example, by the location assignment module 111 alone or in combination with one or more other modules, such as the waypoints module 210. More generally, the process 400 can be implemented by any computer hardware and/or software.

At block 405, the location assignment module 111 can receive multiple stops for multiple vehicles in a fleet of vehicles, for example, from the waypoints module 210. A stop of the multiple stops can include a waypoint location to be visited by one or more vehicles in the fleet of vehicles. For instance, a stop can be a customer site where a vehicle is tasked to visit or deliver one or more items to a customer.

At block 410, the location assignment module 111 can determine one or more initial reference points for vehicles of the fleet of vehicles. A reference point can be associated with an individual vehicle and used to determine a territory or group of stops to be serviced by the individual vehicle. As discussed above, these reference points can be considered gravity points. The gravity point can be at the centroid of what will be the territory for the driver or vehicle. In other embodiments, the gravity point is an approximate center for a territory.

Figure 7:
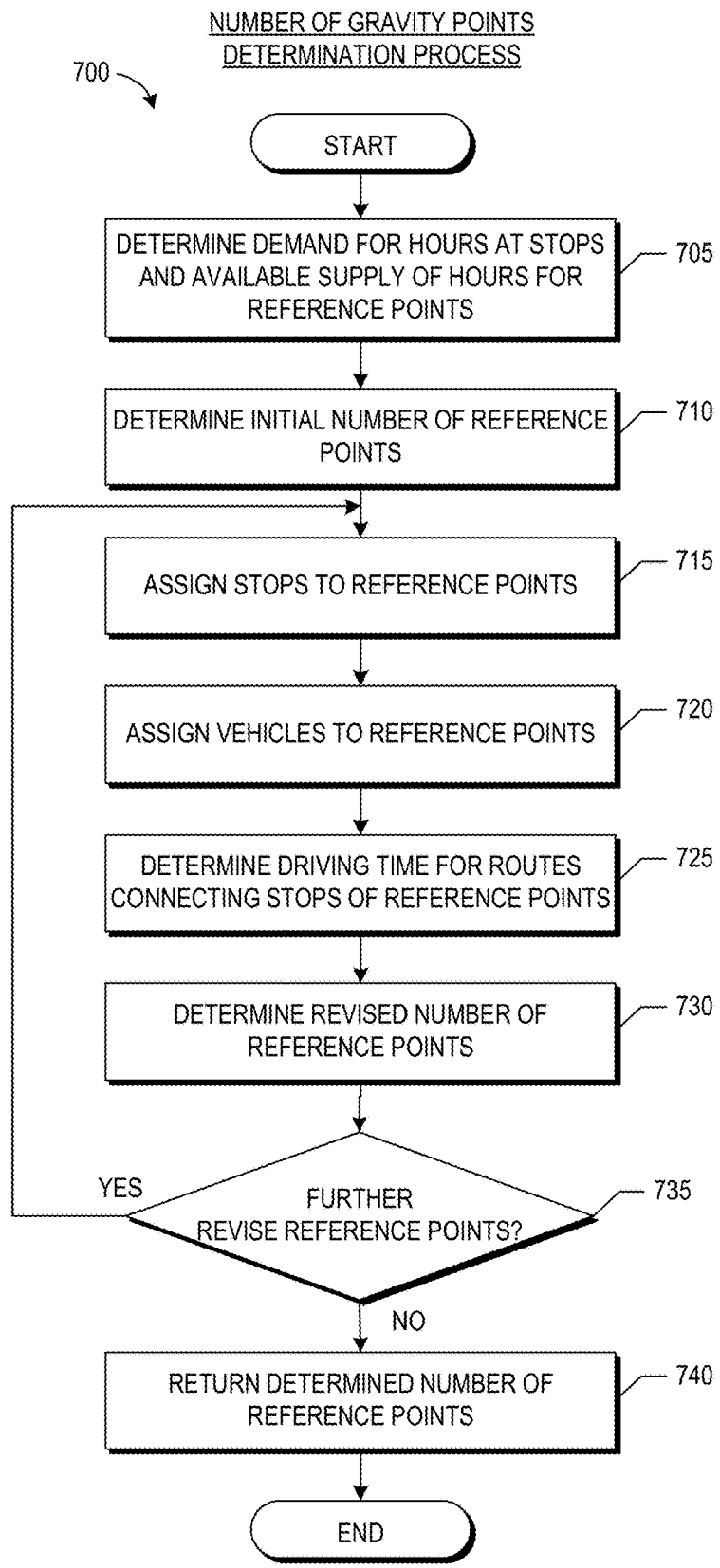
FIG. 7 illustrates an embodiment of a process for determining a number of gravity points to utilize when servicing stops.

In some embodiments, the number of reference points to use can be determined automatically, such as using the process described with respect to FIG. 7. In other embodiments, the number of reference points to use can be received from the vehicle characteristics module 215 based on an input by a user. For instance, the user may know a number of vehicles that they desire to use to service stops, and this value can be input into the vehicle management system 150.

The initial locations of the reference points can be determined using one or more or a combination of algorithms, such as a c-means algorithm, a k-means algorithm, or the like, based on the location of the stops. In some embodiments, the location of a reference point can be the centroid of a received group of stops or the centroid of an assigned group of stops. Other non-centroid based algorithms may also be used to determine the initial locations of the reference points, including distribution-based algorithms such as the expectation-maximization (EM) algorithm. In other embodiments, the initial locations of the reference points can be provided by a user input.

At block 415, the location assignment module 111 can assign the stops to the reference points. One or more or combination of algorithms, including a polygamous stable marriage clustering algorithm, outlier detection, or the like can be used to assign the stops. For example, the assignment process discussed below with respect to FIG. 5 or FIG. 6 may be used. The stops can be assigned to reference points based on a distance from the individual stops to the reference points and/or one or more other constraints, such as an amount of revenue generated by the individual stops, an amount of time-on-site for the individual stops, fuel usage, or any of a variety of other routing factors described in U.S. Pub. No. 2011/0238457, filed Nov. 24, 2010, titled "Vehicle Route Selection Based on Energy Usage," or any of the routing factors described in U.S. application Ser. No. 13/800,719, filed Mar. 13, 2013, titled "Real-Time Computation of Vehicle Service Routes," the disclosures of which is hereby incorporated by reference in their entirety.

At block 420, the location assignment module 111 can determine whether to update the reference points. Different locations of the reference points may, in some cases, result in an improved grouping of the stops. As a result, the location assignment module 111 can, in certain embodiments, advantageously update the locations of the reference points. In some embodiments, the locations of the reference points may be updated a set number of times (e.g., a number of times based on the number of assigned stops or based on the size of a territory including the assigned stops) or simply may not be updated. In other embodiments, a change in the position of corresponding reference points from one or more previous iterations can be used to determine whether to update the locations of the reference points. When the change is less than the threshold amount or distance (e.g., the threshold distance can be 0.1 miles, such that the corresponding reference points move less than 0.1 miles from the previous iteration to the current iteration), the process 400 may determine not to update the reference points. Further, in some embodiments, a number of stops changing groups between one or more previous iterations may be used to determine whether to update the locations of the reference points. When the number of stops changing groups is less than a threshold number, the process 400 may determine not to update the reference points.

When the process 400 determines to update one or more of the reference points, the process 400 moves to block 425. At block 425, the locations of the reference points can be updated by the location assignment module 111 according to the one or more stops assigned to the reference points. For example, the location of a centroid of some or all of the one or more stops assigned to an individual reference point can be the updated location for the individual reference point.

One or more algorithms (examples described above) can be used to update the location of the reference points. After the updated reference points are determined, the process 400 moves to block 415 and assigns the stops to the updated reference points.

If the process 400 determines not to update the reference points, the process 400 moves to block 430. At block 430, the route calculation module 225 can calculate optimized routes connecting the stops assigned to the individual reference points. For instance, a genetic algorithm can be used by the routing calculation module 225 to determine the optimal routes. At block 435, the routes can be output to navigation devices associated with respective vehicles and reference points for presentation to drivers of the vehicles.

Figure 8A:
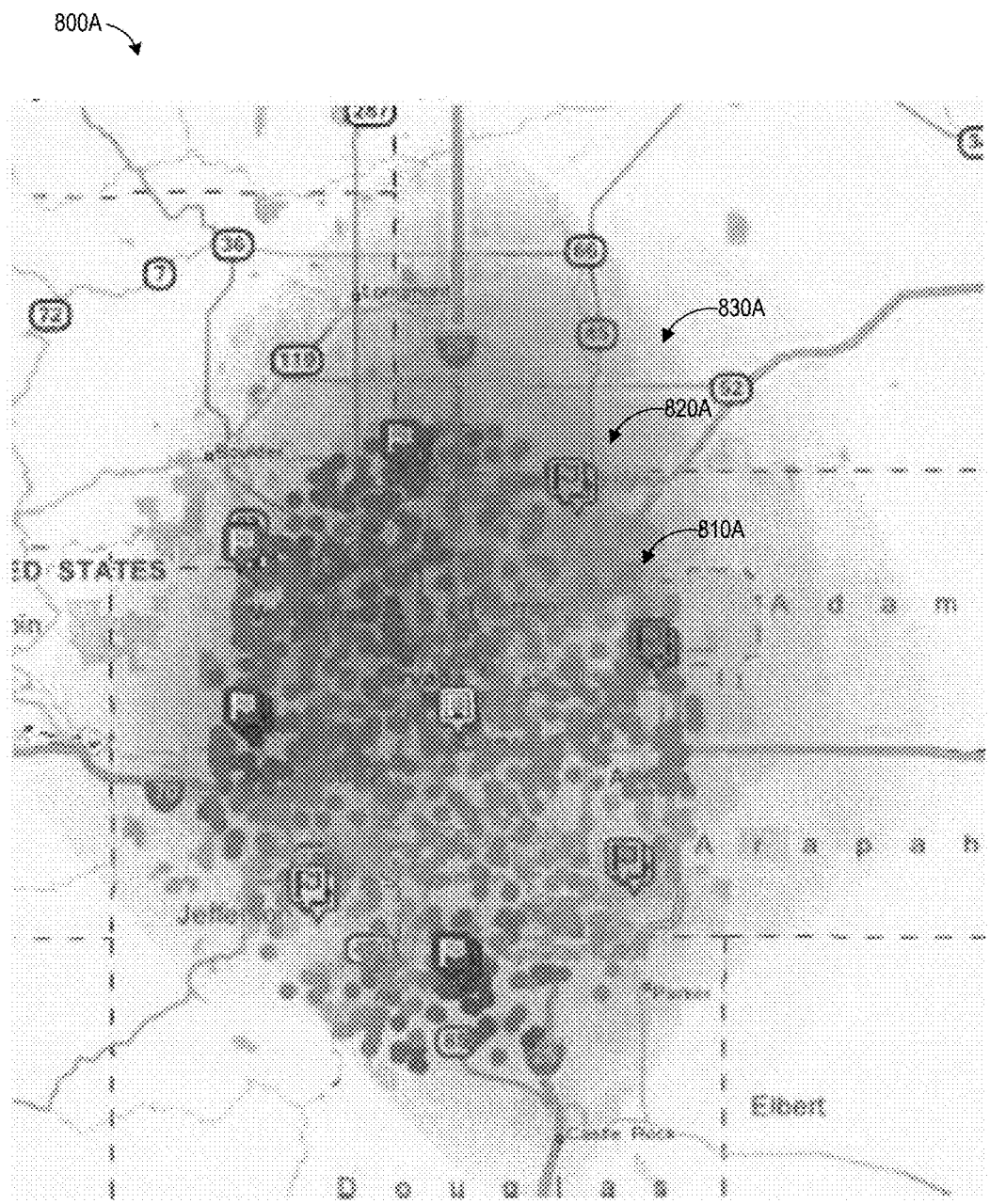
FIGS. 8A and 8B illustrate embodiments of a user interface display for outputting representations of locations based on their presence in one or more adjacent territories.
Figure 8B:
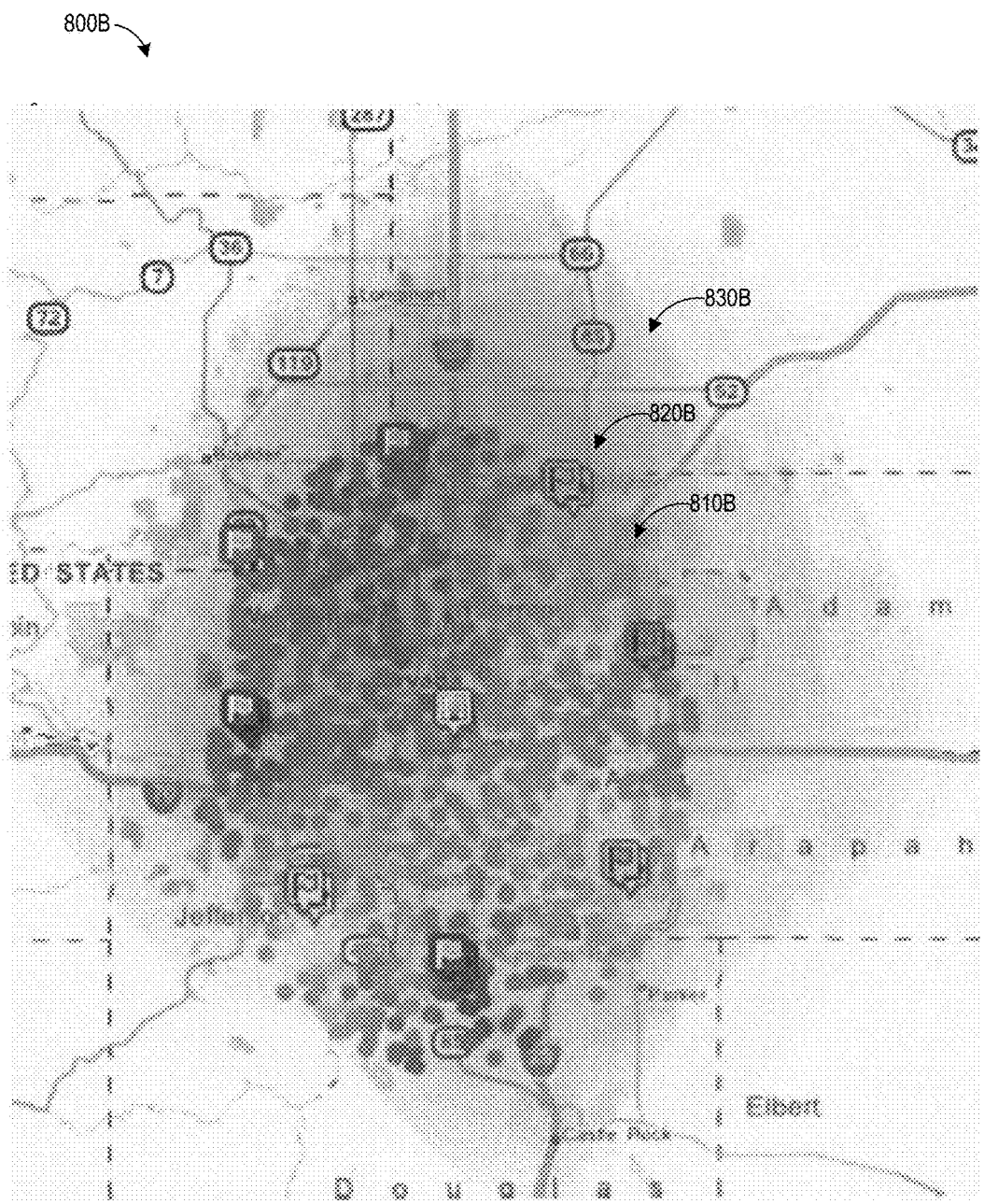

In some embodiments, the user interface of the routing module 110 can display reference points for territories and/or allow a user move reference points as desired. Optionally, a user interface may be included in the management device 135 and configured to provide a graphical representation of stops and related territories. For example, as shown in the user interface display 800A of FIG. 8A, dots 810A on a map correspond to stops and may be color-coded based on the proximity to the territories of different vehicles are drivers. Thus, certain stops are displayed in a color associated with a particular vehicle. However, stops that are about equidistant between the reference points for two territories can be represented as a blend of the two different colors associated with those two different territories. Thus, a user (such as a fleet manager, dispatcher, driver, etc.) can graphically see the group of stops and associated reference points. The depicted embodiment shows the dots 810A for stops in different symbols to represent the different colors of the different territories. In addition, the territories have exponentially (or linearly or nonlinearly) attenuating areas instead of borders, as indicated by dots 820A and 830A that are more-spaced out as distance from a gravity point increases. In an actual user interface (used, for example, by a fleet manager or driver), these dots 820A, 830A may be represented as colors that lighten or fade gradually as the distance from a gravity point increases. Conversely, the color near a gravity point may be darker. Thus, in certain embodiments, customers whose dots (or stops) appear in a driver's color are likely to be serviced by that driver, and customers that could be serviced by more than one driver can appear in a blend of the possible driver's colors. The user interface display 800B of FIG. 8B provides a color illustration corresponding to the user interface display 800A of FIG. 8A, where the dots 810B, 820B, and 830B of the user interface display 800B correspond to the dots 810A, 820A, and 830A of the user interface display 800A, respectively.

Figure 5:
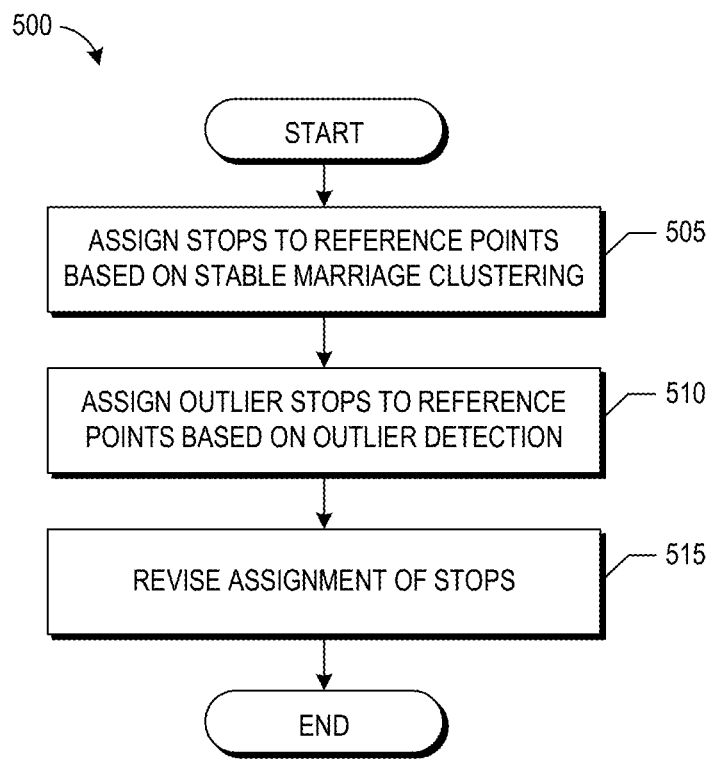
FIG. 5 illustrates an embodiment of a process for assigning stops to gravity points.

Turning to FIG. 5, a process 500 for assigning stops to reference points is illustrated. The process 500 can be performed, for example, by the location assignment module 111 alone or in combination with one or more other modules, such as other modules of the routing module 200. More generally, the process 500 may be implemented by any computer hardware and/or software.

At block 505, the location assignment module 111 can assign stops to reference points based on an improved clustering algorithm—referred to herein as a polygamous stable marriage clustering algorithm. The polygamous stable marriage clustering algorithm can, among other features, provide an iterative approach to assign stops to reference points so that the group of stops assigned to individual reference points satisfy one or more criteria relative to groups of stops assigned to the other reference points. For example, a particular group of stops can be assigned to a reference point so that the assigned group of stops have one or more of the same level of total revenue, time-on-site, driving distance, driving time, number of stops, and the like, as the group of stops assigned to one or more other individual reference points.

At block 510, the location assignment module 111 can assign outlier stops to reference points using outlier detection. Outlier stops may include stops that are relatively far from a reference point and accordingly relatively far from other stops assigned to the reference point. Outliers can be detected by comparing the distance of stops to a mean stop distance from a reference point and considering stops that exceed a threshold distance from the mean to be outliers. Other methods of identifying outliers may also be chosen. One or more of the outlier stops may not have been previously assigned or have been assigned but are not as geographically close to other stops of a group as desirable. As a result, the outlier stops can be assigned or reassigned to particular reference points to increase the closeness of groupings of the stops assigned to the reference points.

At block 515, the assignment of the stops can be revised by the location assignment module 111 to even out the assignment of the groups of stops to the reference points. For example, one or more stops can be reassigned so that the group of stops assigned to an individual reference point has the same level of one or more criteria as the group of stops assigned to another individual reference point. The one or more criteria used to balance the groups may be the same criteria as used at block 505 to assign stops or may be different criteria. For instance, if the groups of stops were assigned at block 505 to have the same level of total revenue, the groups of stops can be rebalanced to further even out the level of revenue among the groups of stops or now balanced to additionally even out an amount of time-on-site for individual groups of the groups of stops.

Figure 6:
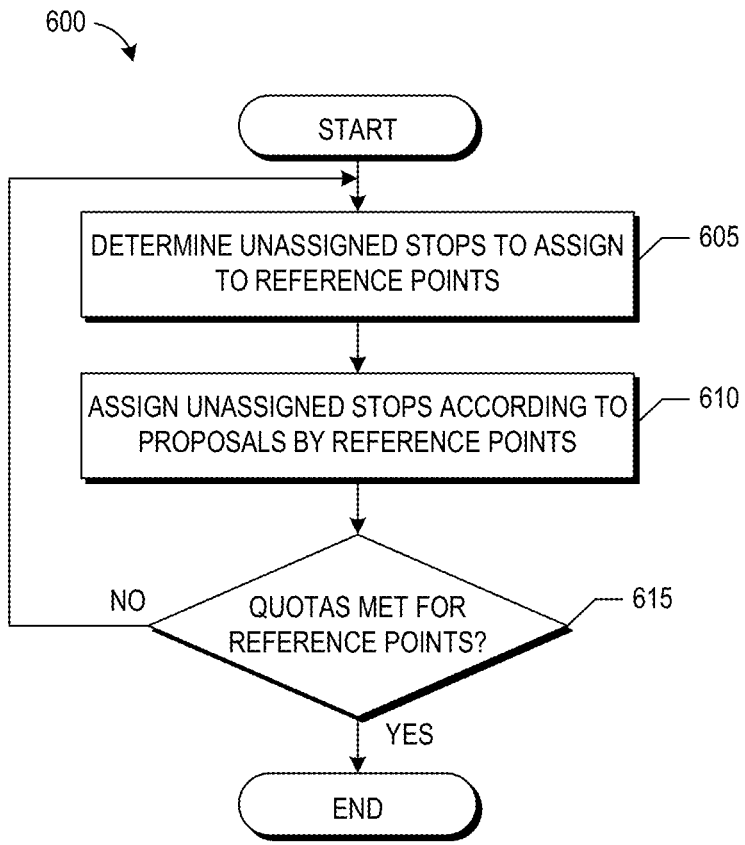
FIG. 6 illustrates an embodiment of a process for assigning stops using a polygamous stable marriage clustering.

With reference to FIG. 6, a process 600 for assigning stops using a polygamous stable marriage clustering algorithm is illustrated. The process 600 can be performed, for example, by the location assignment module 111 alone or in combination with one or more other modules, such as the estimation module 112. Although the process 600 is described with respect to assigning stops to reference points, the process 600 can be further extended to apply to other types of assignments, such as those relating to traffic shaping.

At block 605, the location assignment module 111 can determine unassigned stops, which have not yet been assigned to a reference point. At block 610, one or more of the unassigned stops can be assigned by the location assignment module 111 to the reference points according to proposals by the reference points. A proposal can be an invitation or offer by a reference point for a stop to be assigned to the reference point. For instance, the reference points can individually propose to a select number of the stops near the reference points (e.g., two or three stops in some implementations, although the select number of stops can be less than two or greater than three in other cases). A reference point can order its proposals based on the distance between the reference point and each stop and/or based on one or more other criteria, such as stops currently assigned to the reference point, characteristics of the vehicle or driver associated with the reference point, and the like.

Figure 9:
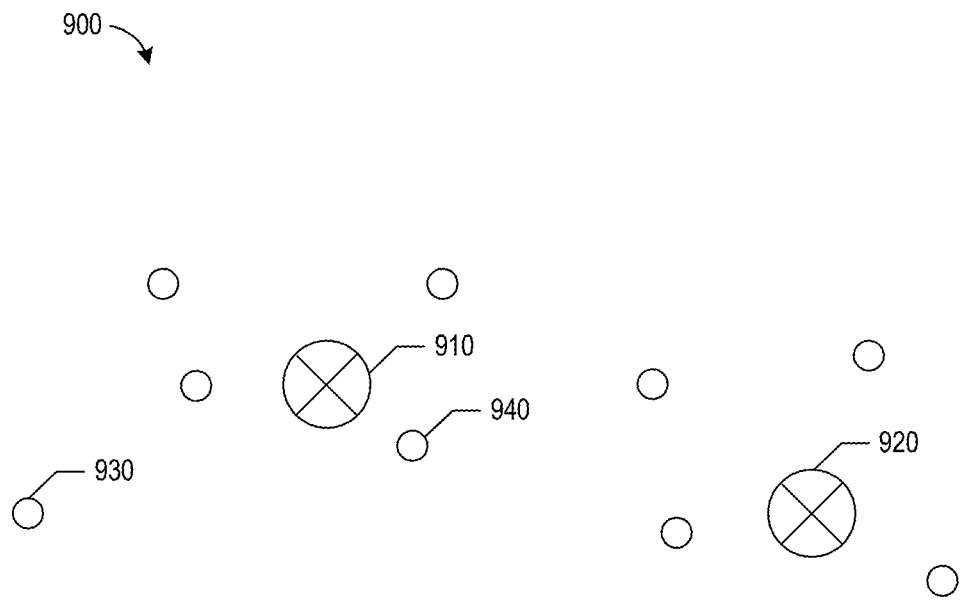
FIGS. 9-11 illustrate embodiments of a user interface display for outputting representations of gravity points and neighboring locations.

In some embodiments, the reference points may propose to the closest stops first. However, in other embodiments, the reference point can advantageously propose to a farther stop first since the reference point may be the closest reference point to the farther stop. As can be seen from the user interface display 900 of FIG. 9, reference point 910 can propose to stop 930 before proposing to stop 940 since reference point 910 is closer to stop 930 than reference point 920 is to stop 930. Moreover, in particular embodiments, the reference point may not propose to certain stops since the vehicle or driver associated with the reference point may not be capable of servicing the certain stops. The reference point, in such cases, may also have a reduced affinity to stops neighboring the certain stops since it may be desirable to assign stops to groups within a relatively close geographic area. In some embodiments, a proposal by a reference point may further have an accompanying strength that influences the likelihood that a proposal is accepted by a stop.

Figure 10:
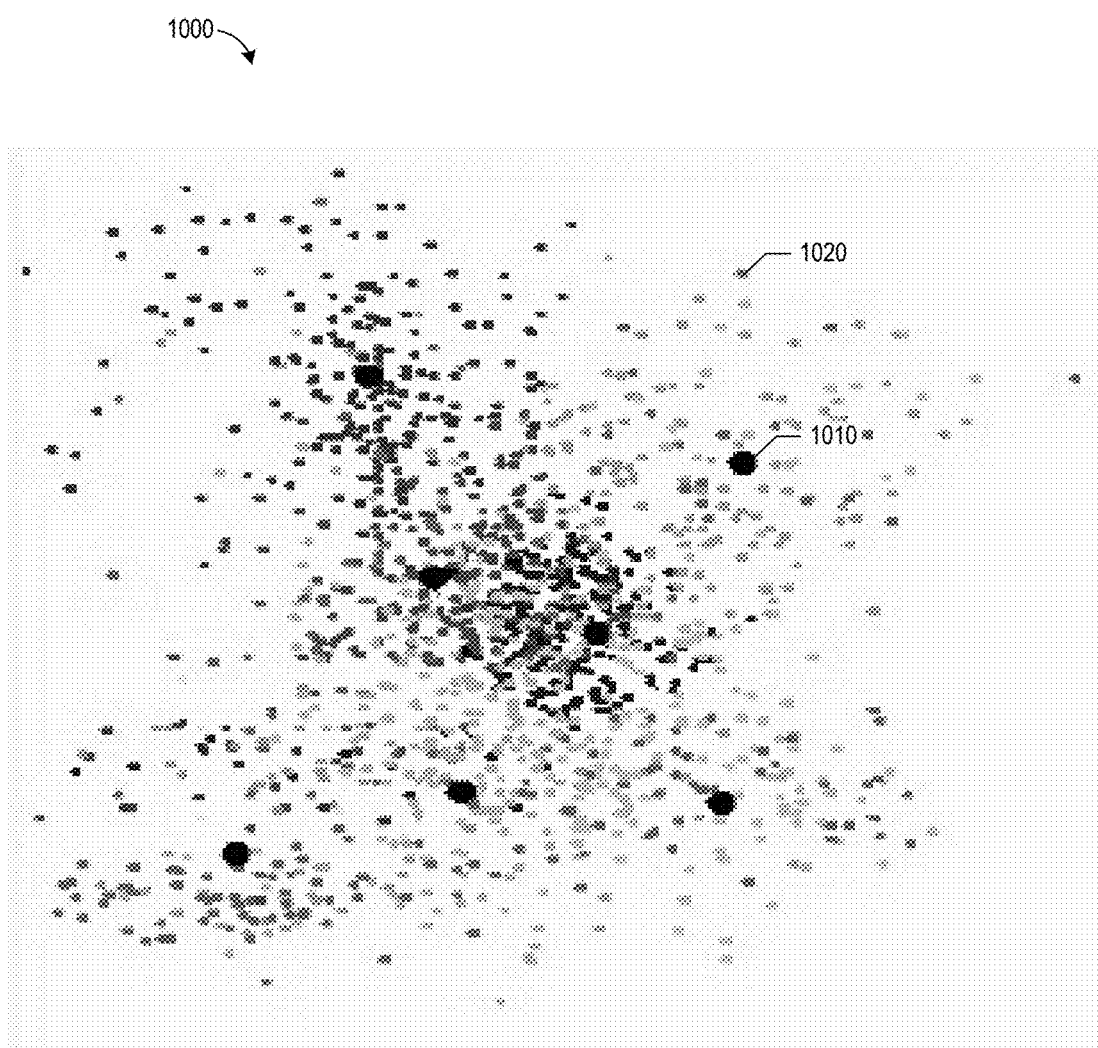
Figure 11:
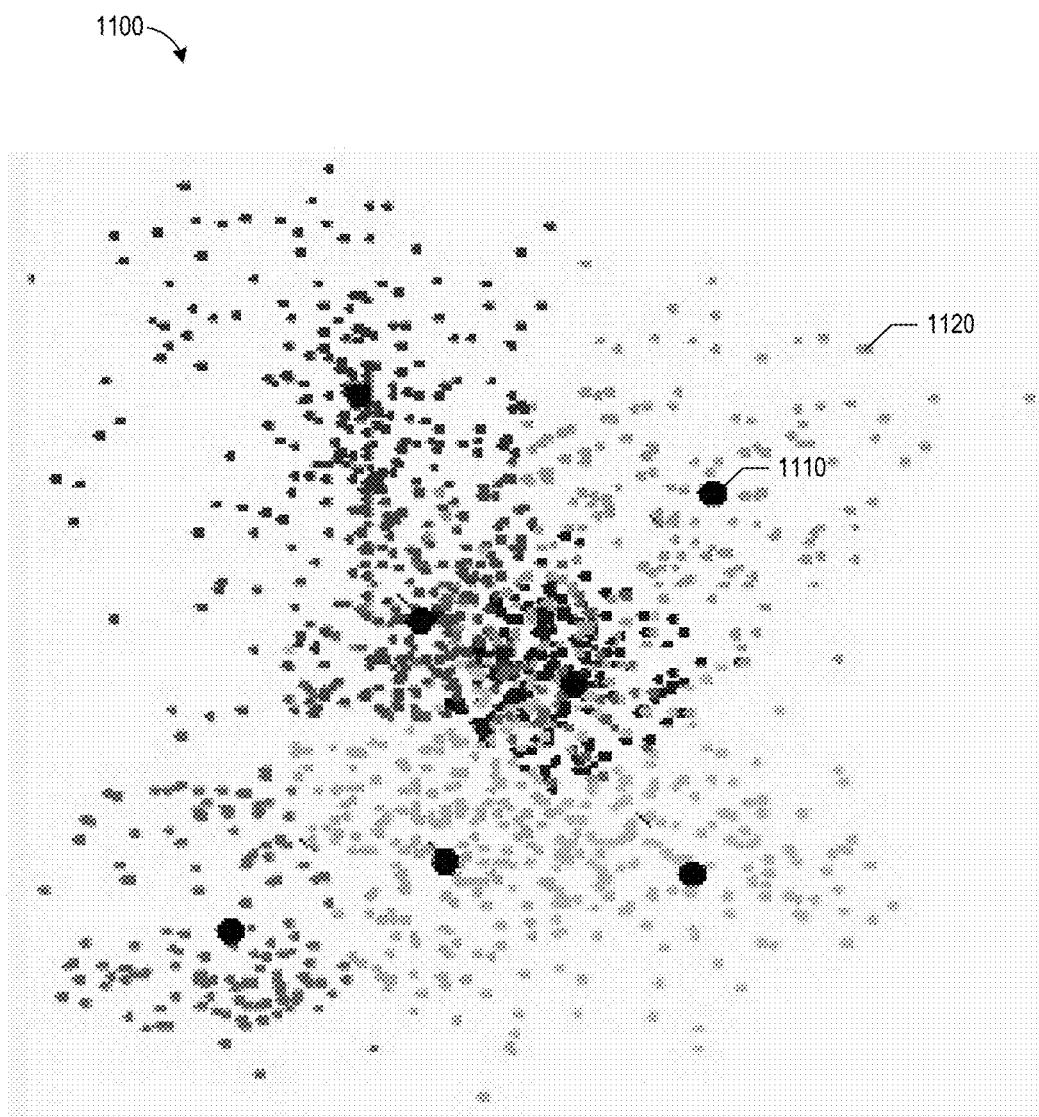

The stops can be assigned by the location assignment module 111 according to whether the stops should accept proposals from the reference points. A stop may determine to accept a proposal from a reference point according to a function based on the distance between the stop and the reference point or based on one or more other criteria, such as the stops currently assigned to the reference point, characteristics of the vehicle or driver associated with the reference point, and the like. In some embodiments, the function can depend on the Euclidean distance (or other norm, e.g., any 0 norm) between the stop and the reference point as illustrated by the user interface display 1000 of FIG. 10. In FIG. 10, stops (shown as the smaller dots), such as stop 1020, are assigned to one of seven reference points (shown as the larger dots), such as reference point 1010. The stops can be color-coded (e.g., purple, dark pink, light pink, red, dark blue, light blue, and green) such that stops that are assigned to the same reference point have the same color. FIG. 10 illustrates an example where 196 stops are assigned to each reference point. In other embodiments, the function can be based on a c-means membership function, such as a fuzzy c-means algorithm, as illustrated by the user interface display 1100 of FIG. 11. In FIG. 11, stops (shown as the smaller dots), such as stop 1120, are assigned to one of seven reference points (shown as the larger dots), such as reference point 1110. The stops can be color-coded (e.g., purple, dark pink, light pink, red, dark blue, light blue, and green) such that stops that are assigned to the same reference point have the same color. FIG. 11 illustrates an example where 196 stops are assigned to each reference point. In some embodiments, the stops can accept proposals from the closest reference point.

At block 615, the location assignment module 111 determines whether quotas are met for the reference points. A quota for a reference point can be a desired level of one or more criteria for a group of stops assigned to the reference point. For instance, a quota can be one or more of an amount of revenue for a group of stops, a time-on-site for the group of stops, a driving time for the group of stops, a number of customers for the group of stops, and the like. The quota for one reference point can be the same as or different from the quota for one or more other reference points. The quota may be met for a reference point when the group of stops assigned to the reference point together meet or exceed a level or threshold of the one or more criteria.

In one illustrative example, a total time-on-site for stops is 1000 hours for a fleet of five vehicles, and the total revenue for the same stops is $100,000. The five vehicles (or five reference points) are used to service the stops, and each of the five vehicles is expected to have an equal production. As a result, the quota for each of the five vehicles in this example can be 200 hours of time-on-site for its stops or $20,000 of revenue for its stops. The quota for one vehicle of the five vehicles accordingly can be met when the vehicle meets or exceeds the 200 hours of time-on-site level or the $20,000 of revenue level for its assigned stops. In some embodiments, a reduced quota for one or more reference points can be set below a full quota (e.g., the quota can be 70%, 80%, or 90%, and the like, of a full quota) so that the one or more reference points meet or exceed the reduced quota, and the remaining stops can be assigned using one or more other approaches or algorithms.

In another illustrative example, each vehicle in a fleet of five vehicles is expected to drive for 10 hours per day. As a result, the quota for each of the five reference points associated with the five vehicles can be met when a route connecting a group of stops assigned to the reference point meets or exceeds 10 hours of driving time. In some embodiments, the estimation module 112 can be used by the location assignment module 111 to determine an estimated driving time for a route connecting the group of stops to facilitate a faster determination of the driving time. In other embodiments, an optimized route connecting the group of stops can be determined using the route calculation module 225.

When the quotas for the reference points are not met at block 615, the process 600 moves to block 605 and begins another iteration of assigning stops to reference points with unmet quotas by determining unassigned stops that have to assign to the reference points. On the other hand, when the quotas for the reference points are met at block 615, the process 600 terminates. In some embodiments, the process 600 can perform multiple iterations (e.g., 3, 10, or 50 or more iterations) until the quotas for the reference points are met. Moreover, in some embodiments, the process 600 can assign hundreds, thousands, or tens of thousands of stops to the reference points, for example, to facilitate generating routes for a fleet of vehicles.

FIG. 7 illustrates a process 700 for determining a number of reference points to utilize when servicing a set of stops. The process 700 can be performed, for example, by the vehicle count module 113 alone or in combination with one or more other modules, such as the location assignment module 111 and the estimation module 112. More generally, the process 700 can be implemented by any computer hardware and/or software.

At block 705, the vehicle count module 113 can determine the demand for hours at a set of stops and the available supply of hours for reference points. The demand for hours can be the total time-on-site for the set of stops, and the available supply of hours can be the total available work hours for the vehicles corresponding to the reference points.

At block 710, the vehicle count module 113 can determine an initial number of reference points to utilize in servicing the set of stops. The initial number of reference points can be determined based on the demand for hours and the available supply of hours for the reference points. For instance, the initial number of reference points can equal the demand for hours divided by the average available supply of hours for the reference points.

At block 715, the vehicle count module 113 can utilize the location assignment module 111 to assign the stops to the reference points. One or more or combination of algorithms, including a polygamous stable marriage clustering algorithm, outlier detection, and the like can be used to assign the stops. For example, the assignment process discussed with respect to FIG. 5 may be utilized. The stops can be assigned to the reference points based on a distance from the individual stops to the reference points and/or one or more other constraints, such as an amount of revenue generated by the individual stops or an amount of time-on-site for the individual stops, for instance.

At block 720, the vehicle count module 113 can utilize the location assignment module 111 to determine vehicles or drivers to assign to the reference points.

At block 725, the vehicle count module 113 can determine a driving time for routes connecting stops assigned to the reference points. In some embodiments, the estimation module 112 can be used to provide an estimate of the driving time for a route connecting the stops assigned to a reference point. Additionally or alternatively, the route calculation module 225 can be used to determine the driving time for an optimized route connecting the assigned stops of a reference point.

At block 730, the vehicle count module 113 can determine a revised number of reference points. The revised number of reference points can be determined based on the demand for hours, the determined driving time for routes connecting stops assigned to the reference points, and the available supply of hours for the reference points. For example, initially, an amount of extra time not provided by the selected number of reference points and vehicles can be determined. The amount of extra time can equal the sum of the demand for hours and the determined driving time less the available supply of hours for the selected reference points and vehicles. If the amount of extra time is positive, the number of extra reference points can equal the amount of extra time divided by the average available work hours for the vehicles corresponding to the unselected reference points, rounded up. If the amount of extra time is negative, the reduction in the number of reference points can equal the absolute of the amount of extra time divided by the average available work hours for the vehicles corresponding to the selected reference points, rounded down. The number of reference points can then be revised based on calculated the number of extra reference points or the reduction in the number of reference points.

At block 735, the vehicle count module 113 can determine whether to further revise the reference points. The vehicle count module 113 can determine not to further revise the reference points if the number of extra reference points or the reduction in the number of reference points determined at block 730 is zero. Moreover, the vehicle count module 113 can determine not to further revise the number of reference points if the number of reference points from the previous iteration equals the revised number of reference points from this iteration. In such cases, the number of references points may perpetually switch between two values after successive iterations, so the vehicle count module 113 may not further revise the references points and can instead select the greater of the two values as the determined number of reference points. In other cases, the vehicle count module 13 can determine to further revise the number of reference points, so the process 700 returns to block 715.

At block 740, the vehicle count module 113 can return the determined revised number of reference points. For example, the revised number of reference points can be transmitted to the location assignment module 111.

IV. Terminology

As used herein, the term "street," in addition to having its ordinary meaning, can include, among other things, a road, a highway, a freeway, a toll road, a turnpike, an arterial road, a frontage road, an on-ramp, an off-ramp, a city street, a surface street, a residential street, a dirt road, a parking lot, a driveway, an intersection, a traffic circle, a roundabout, a rotary, an alley, any path upon which a vehicle can travel, combinations of the same, or the like. Further, although this specification refers primarily to streets for automobiles, trucks, and the like, the techniques described herein can also be applied to paths traveled by other vehicles, such as railroads, flight paths, and waterways.

Many variations other than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 150 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for routing vehicles in a vehicle fleet, the system comprising:
   a plurality of vehicles in the vehicle fleet,
   a plurality of display devices comprising a vehicle-based display unit or a handheld mobile device, each display device of the plurality of display devices associated with a corresponding vehicle of the plurality of vehicles, and
   a vehicle management system in communication with the plurality of display devices over a network, wherein, said vehicle management system comprises:
      a memory device configured to store a plurality of locations positioned along a network of streets in a geographic region; and
      a hardware processor in communication with the memory device, the hardware processor configured to:
         assign at least some of the plurality of locations to a plurality of territories associated with the plurality of vehicles by iteratively:
            determining whether one or more allocation thresholds is met for the plurality of territories based at least on the locations of the plurality of locations already assigned to the plurality of territories, each of the one or more allocation thresholds denoting a performance level for at least one of the plurality of territories, each of the plurality of territories having an associated reference location positioned in the geographic region, and
            in response to determining that the one or more allocation thresholds is unmet for at least two of the plurality of territories, assigning one of the plurality of locations not yet assigned to the plurality of territories to one of the at least two of the plurality of territories based at least on a proximity of the one of the plurality of locations not yet assigned to the plurality of territories to (i) the reference location associated with the one of the at least two of the plurality of territories and (ii) the reference location associated with another of the at least two of the plurality of territories;
         generate a plurality of routes connecting the plurality of locations on the network of streets for the plurality of vehicles so that each of the plurality of routes connects the locations of the plurality of locations assigned to one of the plurality of territories; and
         output the plurality of routes and feedback to the plurality of display devices for presentation to a plurality of drivers of the plurality of vehicles, wherein the feedback includes a real-time suggested driving route modification based on traffic or weather conditions.

2. The system of claim 1, wherein the hardware processor is configured to determine whether the one or more allocation thresholds is met for the plurality of territories by determining whether a first allocation threshold of the one or more allocation thresholds is met for a first territory of the plurality of territories, the first allocation threshold being met when a total value for the locations of the plurality of locations assigned to the first territory meets or exceeds the first allocation threshold.

3. The system of claim 2, wherein the hardware processor is configured to determine whether the one or more allocation thresholds is met for the plurality of territories by determining whether the first allocation threshold is met for a second territory of the plurality of territories different from the first territory.

4. The system of claim 1, wherein the hardware processor is configured to determine whether the one or more allocation thresholds is met for the plurality of territories by determining whether a first allocation threshold of the one or more allocation thresholds is met for a first territory of the plurality of territories, the first allocation threshold being met when a fuel usage for a first route connecting the locations of the plurality of locations assigned to the first territory meets or exceeds the first allocation threshold.

5. The system of claim 1, wherein the hardware processor is configured to determine whether the one or more allocation thresholds is met for the plurality of territories by determining whether a first allocation threshold of the one or more allocation thresholds is met for a first territory of the plurality of territories, the first allocation threshold being met when a total time-on-site for the locations of the plurality of locations assigned to the first territory meets or exceeds the first allocation threshold.

6. The system of claim 5, wherein the hardware processor is configured to determine whether the one or more allocation thresholds is met for the plurality of territories by determining whether a second allocation threshold of the one or more allocation thresholds is met for a second territory of the plurality of territories, the second allocation threshold being different from the first allocation threshold and being met when a total time-on-site for the locations of the plurality of locations assigned to the second territory meets or exceeds the second allocation threshold.

7. The system of claim 1, wherein the hardware processor is configured to determine whether the one or more allocation thresholds is met for the plurality of territories by determining whether a first allocation threshold of the one or more allocation thresholds is met for a first territory of the plurality of territories, the first allocation threshold being met when a total estimated driving time for a first route connecting the locations of the plurality of locations assigned to the first territory meets or exceeds the first allocation threshold.

8. The system of claim 1, wherein the hardware processor is configured to revise a position of the reference location associated with a first territory of the plurality of territories subsequent to the hardware processor determining that a first allocation threshold of the one or more allocation thresholds is unmet for the first territory.

9. The system of claim 8, wherein the hardware processor is configured to revise the position of the reference location associated with the first territory based at least on the locations of the plurality of locations assigned to the first territory.

10. The system of claim 1, wherein the hardware processor is configured to:
  assign one or more of the plurality of locations to the plurality of territories based at least on outlier detection; and
  reassign one or more of the locations of the plurality of locations assigned to a first territory of the plurality of territories to a second territory of the plurality of territories different from the first territory to even out one or more criteria for the first territory and the second territory.

11. The system of claim 10, wherein the one or more criteria comprise a total amount of return for each of the first territory and the second territory.

12. The system of claim 10, wherein the one or more criteria comprise a total time-on-site for each of the first territory and the second territory.

13. The system of claim 1, wherein the hardware processor is configured to determine a number of territories to include in the plurality of territories, the number of territories being a minimum number of territories to use to service a set of stops where each of the plurality of territories is associated with a different vehicle of the plurality of vehicles.

14. The system of claim 1, wherein at least some of the plurality of territories overlap one another.

15. A method for routing vehicles in a vehicle fleet, the method comprising:
  under control of a hardware processor of a vehicle management system, the vehicle management system configured to communicate with a plurality of display devices, each display device of the plurality of display devices associated with a corresponding vehicle of a plurality of vehicles:
    assigning one or more locations of a plurality of locations not yet assigned to a plurality of territories to one of a first territory of the plurality of territories and a second territory of the plurality of territories based at least on a proximity of the one or more locations not yet assigned to the plurality of territories to a first reference location associated with the first territory and a second reference location associated with a second territory;
    in response to assigning the one or more locations not yet assigned to the plurality of territories to the first territory, determining whether a first allocation threshold for the first territory is met based at least on the locations of the plurality of locations assigned to the first territory, the first allocation threshold denoting a first performance level for the first territory;
    in response to determining that the first allocation threshold is unmet, assign one or more first additional locations of the plurality of locations not yet assigned to the plurality of territories to the first territory based at least on a proximity of the one or more first additional locations not yet assigned to the plurality of territories to the first reference location;
    in response to assigning the one or more locations not yet assigned to the plurality of territories to the second territory, determining whether a second allocation threshold for the second territory is met based at least on the locations of the plurality of locations assigned to the second territory, the second allocation threshold denoting a second performance level for the second territory;
    in response to determining that the second allocation threshold is unmet, assigning one or more second additional locations of the plurality of locations not yet assigned to the plurality of territories to the second territory based at least on a proximity of the one or more second additional locations not yet assigned to the plurality of territories to the second reference location;
    generating a first route connecting the locations of the plurality of locations assigned to the first territory on a network of streets in a geographic region;
    generating a second route connecting the locations of the plurality of locations assigned to the second territory on the network of streets;
    outputting the first route to a first display device of the plurality of display devices for presentation to a first driver of a first vehicle of the plurality of vehicles;
    outputting the second route to a second display device of the plurality of display devices for presentation to a second driver of a second vehicle of the plurality of vehicles, the second display device different from the first display device; and
    outputting feedback to the first and the second display devices for presentation to the first and second drivers, respectively, wherein the feedback includes a real-time suggested driving route modification based on traffic or weather conditions.

16. The method of claim 15, wherein the first allocation threshold is met when a total value for the locations of the plurality of locations assigned to the first territory meets or exceeds the first allocation threshold.

17. The method of claim 16, wherein the first allocation threshold is the same as the second allocation threshold.

18. The method of claim 15, further comprising prior to said assigning the one or more first additional locations to the first territory, revising a position of the first reference location based at least on the locations of the plurality of locations assigned to the first territory.

19. The method of claim 15, further comprising reassigning one or more of the locations of the plurality of locations assigned to the first territory to the second territory to even out one or more criteria for the first territory and the second territory.

20. The method of claim 15, further comprising:
   displaying the first route on the first display device to the first driver of the first vehicle; and
   displaying the second route on the second display device to the second driver of the second vehicle.

\* \* \* \* \*